Figure 1:
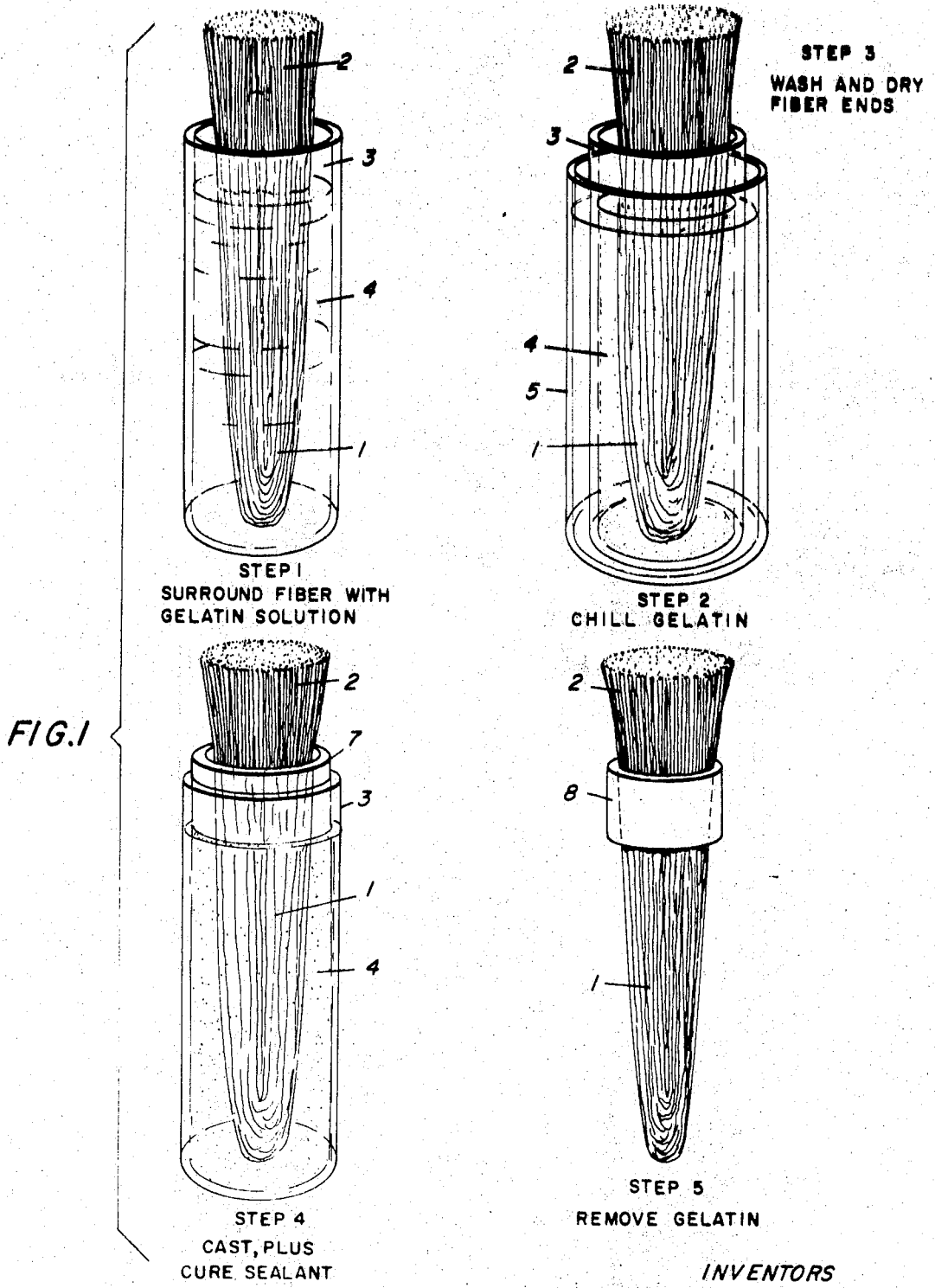

United States Patent [19]

Horres, Jr. et al.

[11] 3,730,959
[45] May 1, 1973

[54] FABRICATION OF HIGH PRESSURE SEALS FOR WATER EQUILIBRATED FIBER BUNDLES

[75] Inventors: Charles Russell Horres, Jr., Chapel Hill; Richard L. Leonard, Raleigh, both of N.C.

[73] Assignee: The United States of America as represented by the Secretary of the Interior

[22] Filed: July 8, 1971

[21] Appl. No.: 160,668

[52] U.S. Cl. ............... 264/263, 210/321, 264/265, 264/271, 264/317, 264/DIG. 44
[51] Int. Cl. ............................ B29d 3/02, B29d 27/00
[58] Field of Search .......................... 264/41, 49, 221, 264/317, 261, 263, 265, 371, 41, DIG. 44; 210/321

[56] References Cited

UNITED STATES PATENTS

| | | | |
|---|---|---|---|
| 3,422,008 | 1/1969 | McLain | 210/22 |
| 3,704,223 | 11/1972 | Dietzsch et al. | 210/321 X |
| 3,551,331 | 12/1970 | Cescon et al. | 264/41 X |
| 2,694,228 | 11/1954 | Mathis | 264/317 X |
| 2,757,439 | 8/1956 | Burns | 264/317 UX |
| 3,522,339 | 7/1970 | Te Velde | 264/261 X |
| 1,082,231 | 12/1913 | Nale | 264/261 X |

OTHER PUBLICATIONS

National Academy of Sciences–National Research Council. Desalination Research Conference. Proceedings of the Conference on Desalination Research. Woods Hole, Mass., 14 June to 14 July 1961."Hollow Fibers As Membranes for Reverse Osmosis" by Henry I. Mahon, publication 942. 1963, pp. 345–348.

*Primary Examiner*—Philip E. Anderson
*Attorney*—Ernest S. Cohen et al.

[57] ABSTRACT

The formation of high pressure seals for water equilibrated, hollow fiber membranes is effected by injecting a solution of gelatin around the active membrane area, chilling the solution to solidify the gelatin and immobilize the water, washing the ends or inactive area of the membrane with warm water, drying the ends, and casting a seal on the solidified gelatin surface. The gelatin is removed by heating and washing the fibers.

12 Claims, 3 Drawing Figures

Patented May 1, 1973

3,730,959

2 Sheets-Sheet 1

STEP 1
SURROUND FIBER WITH
GELATIN SOLUTION

STEP 2
CHILL GELATIN

STEP 3
WASH AND DRY
FIBER ENDS

STEP 4
CAST, PLUS
CURE SEALANT

STEP 5
REMOVE GELATIN

INVENTORS
CHARLES RUSSELL HORRES
RICHARD L. LEONARD

BY *Ernest S. Cohen*

ATTORNEY

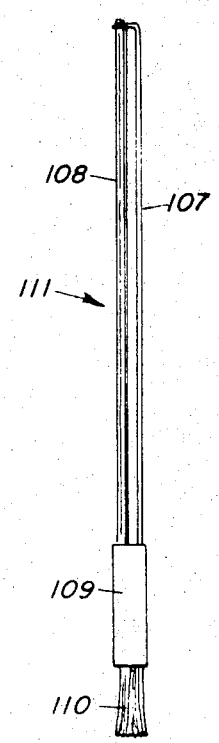
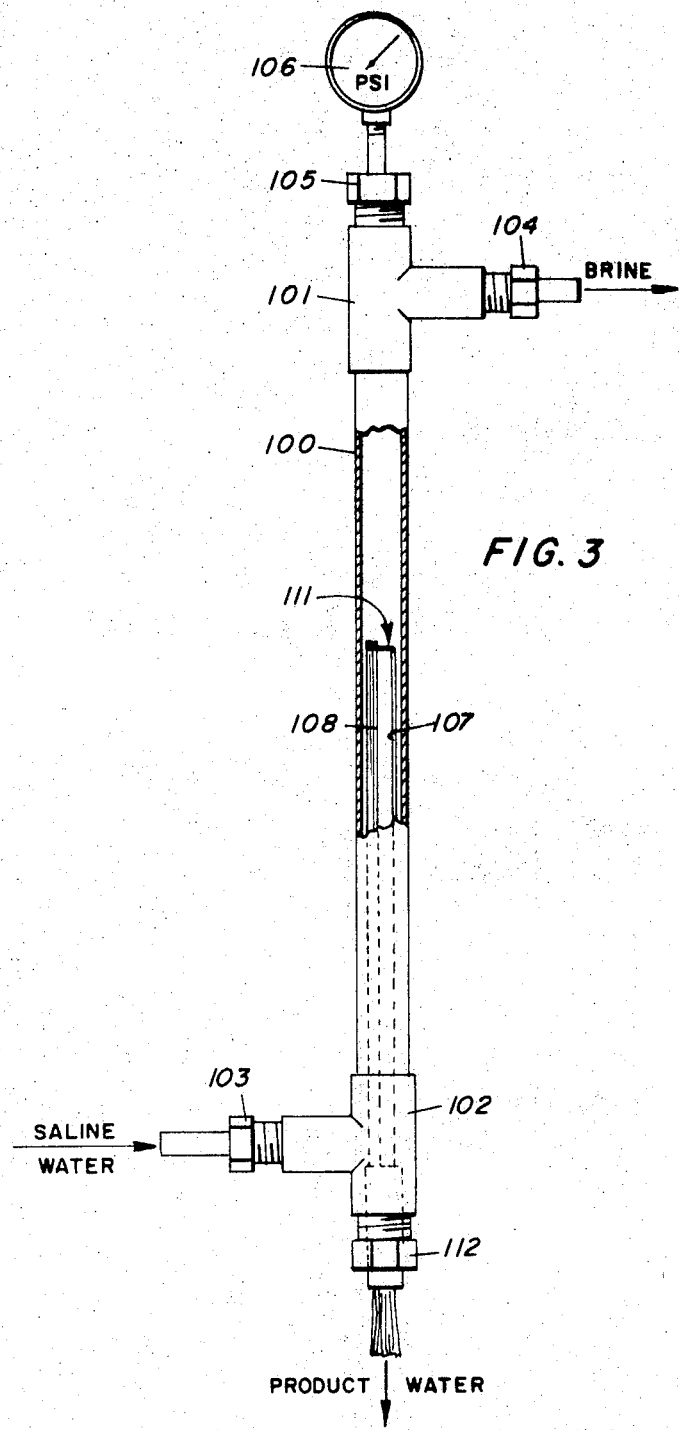

FABRICATION OF HIGH PRESSURE SEALS FOR WATER EQUILIBRATED FIBER BUNDLES

BACKGROUND

One of the most promising techniques for the commercial desalination of saline waters, reverse osmosis is, as its name implies, the opposite of another process. Osmosis is a naturally occurring phenomenon in which solvent from a dilute solution passes through a membrane into a more concentrated solution. This flow will continue unless opposed by a pressure equal in force to the characteristic osmotic pressure of the system. In reverse osmosis, therefore, the flow of solvent is completely reversed by applying a pressure greater than osmotic to the concentrated solution. Thus, by contacting an appropriate membrane with saline water under sufficient pressure, pure water will be forced through the membrane and recovered on the opposite side.

Obviously, the key to this process is in finding a membrane which demonstrates normal osmosis with respect to the solution to be separated. Thus, reverse osmosis was not known as a method for desalinating aqueous sodium chloride solutions until late in the 1950's when it was discovered that cellulose acetate allowed the passage of water from a dilute solution to a more concentrated one while prohibiting the flow of salt. Since that time new methods of forming cellulose acetate membranes and new membrane materials have been discovered in an attempt to find a commercially acceptable membrane.

To be economical a reverse osmosis membrane must meet the requirements of adequate selectivity and water flux. Selectivity refers to the relative ability of the membrane to permit the flow of solvent while rejecting the passage of salt. The ideal membrane would completely prohibit the flow of salt. Naturally, even with a membrane of perfect selectivity, the process will not be economical if pure water merely trickles through it. The second requirement of adequate flux, therefore, refers to the quantity of pure water flowing through a unit area of the membrane in a certain amount of time. Research to date has been effective in producing membranes with both good selectivity and water flux.

In addition to improvements in membrane properties, new designs for desalination systems have brought economic savings. Some of the most promising commercial systems use bundles of membranes formed into tiny hollow fibers, typically with outside diameters of from 50 to 40 microns and with wall thickness to diameter ratios of from 0.15 to 0.35. These fibers present a tremendously large membrane surface area per volume of equipment and thus, even if the flux or flow per area of the membrane is not the best, the rate of recovery of pure water from the system may be least be acceptable. Although desalination systems using bundles of hollow fibers may actually be used in many specific different designs, the usual one will have the saline water pressurized from about 15 to 1,500 psi or more on the outside of the hollow fibers. Pure water moves through the membrane surfaces and is channeled by the fibers to collection means outside the desalination area.

Because of the high pressures employed and the contamination of product water which might be caused by leaks in the system, membrane seals separating the high pressure areas from the collection zones are critical in all reverse osmosis desalination systems. The formation of seals around the ends of the many little fibers used in a hollow fiber bundle has created special problems. It is to the solution of these particular problems that this invention is directed, although as discussed later, the solution we have found may be applied to the formation of seals in other systems with similar problems.

The usual method of forming the seals on the end of a hollow fiber membrane bundle is shown, for example, in U.S. Pat. No. 3,442,389 to McLain. A mold is placed around the ends of the hollow fibers and a solidifiable material such as epoxy resin is poured around these ends. After the resin hardens, a cross sectional cut may be made through the resin and mold to expose the fiber ends.

As mentioned in the patent, in order to form an effective seal it is necessary to use a sealant which is fluid enough to completely surround and encapture all the fiber ends in the closely packed bundle. The patent, however, acknowledges that if the sealant is very fluid, there is a tendency for "wicking" to occur. In this phenomenon sealant creeps along the fibers particularly in channels formed between parallel fibers and out onto the active portions of the membrane. "Active portion" refers to that part of the membrane fiber through which reverse osmosis and desalination is effected as opposed to the inactive portions around which the seal is formed and which extend beyond the seal to the product collection means. Unfortunately, sealant which "wicks" onto the active surfaces hardens there and deadens these active areas.

U.S. Pat. No. 3,442,002 to Geary et al. shows one solution to the problem of wicking—centrifugal casting of the seal. By rotating the fiber bundle during casting and curing of the membrane a centrifugal force is applied outwardly away from the active areas thereby offsetting the forces which cause wicking to occur.

Although the method of Geary et al may be effective in preventing wicking and localized deadening of active membrane surfaces, the membrane surfaces may still be partially or completely impaired. Most membrane materials are water equilibrated and from the time of their formation to their use they are kept in contact with water; this is particularly true of membranes of cellulose acetate and other cellulose derivatives. However, a problem exists since a satisfactory sealant for high pressure use has not been found for wet fibers. Either the moisture in and on the fiber is not compatible with the sealant, terminating cure, or the bond formed is not strong enough to prevent separation from the fiber as it dries during curing. Attempts to form seals while drying only the ends of the fibers have failed because water wicks from the other membrane areas into the seal. Unfortunately, allowing the membranes to be dried and to remain drying during casting and curing of the seal may permanently effect their osmotic properties.

We have now discovered a method of overcoming these problems and it is an object of our invention to improve the method of forming seals on the end of hollow fiber water equilibrated reverse osmosis membranes.

More generally, it is an object of our invention to improve the method of forming seals where the "wicking" of sealant from the area being sealed or the wicking of liquids into the seal may present problems.

It is also a general object of our invention to improve the method of forming seals whenever the areas outside the seal are water equilibrated.

The basic steps of our process will be described in the following specification and are illustrated in FIG. 1 showing the formation of a seal on a hollow fiber bundle.

FIG. 2 illustrates a typical hollow fiber bundle and seal formed by the process and suitable for use in the reverse osmosis desalination apparatus shown in FIG. 3.

INVENTION

We have now found a method for avoiding the previous disadvantages of forming seals for water equilibrated hollow fiber membranes. The essence of the invention is that a distinct separation is formed between dry and wet fiber regions so that the properties of the active membrane areas are not impaired when the inactive membrane regions are dried for seal formation. This result is achieved by surrounding the active fiber areas with a water immobilizing gel and thereafter forming the seal on the dry inactive fiber region.

This process is illustrated in FIG. 1. A bundle of looped membrane fibers 1 are placed in an appropriate container such as a tube or cylinder 3 such that all the fiber ends 2 are exposed. A warm aqueous solution of gelatin or other water immobilizing material 4 is then poured into the container to surround the active membrane surfaces. Thus, the container is filled to a level such that all membrane surfaces that will be in contact with saline solution when the membranes are in operation will be covered by gelatin.

In step 2 the aqueous gelatin solution is chilled to solidify the gelatin 4 and immobilize the water surrounding the active membrane area. This may be accomplished, for example, by immersing the container 3 in an ice bath 5 at least up to the level of the solution in the container. The gel solution is continuously chilled and kept in a solid state until after the seal has been cast and has cured.

Following the solidification of the aqueous gelatin solution, the fiber ends 2 are prepared for sealing. This preparation will most likely consist of washing the ends with warm water to remove any gelatin solution which has "wicked" into these ends and then drying them for a sufficient time to insure that the casting and curing of the seal will not be impaired by retained water. The drying may be accomplished with either air or some inert atmosphere such as nitrogen, carbon dioxide or other gaseous media. While it is essential that the membrane ends are thoroughly dried before casting of the seal, extreme drying conditions should be avoided to prevent the ends from becoming brittle.

In step 4 the seal around the fiber ends is prepared. This may be accomplished, for example, by surrounding the fiber ends with a cylindrical mold 7, which is pressed into the surface of the gelatin. Subsequently, an epoxy resin or other suitable sealant is poured into the mold onto the solidified gelatin surface so that each fiber end is encaptured in resin. Any suitable epoxy resin or other sealant known in the art may be used such as those shown in U. S. Pat. No. 3,422,008 herein incorporated by reference. The fiber ends 2 extend beyond the sealant.

When this sealant has hardened, the solidified gelatin is removed from around the active membrane surfaces. This may be accomplished by warming the gelatin, removing the gelatin and fibers from the container, and washing the fibers to remove adhered traces of gelatin. The membrane is then ready for use although it may be stored with at least the active membrane areas immersed in water. The hollow fiber bundle and attached seal 8 of hardened epoxy resin is shown in its finished form in step 5.

FIGS. 2 and 3 show how a hollow fiber membrane bundle and attached seal formed by our process could be used to desalinize water by reverse osmosis. The apparatus consists of a hollow tube 100 to which T-joints 101 and 102 are attached at either end.

The membrane element 111 consists of hollow fiber membrane bundle 108 which is looped around the top of a support rod 107 such that all ends 110 of the fibers are held by a seal at the base of the support rod. The seal 109 consists of a length of stainless steel tubing in which the fibers are sealed with epoxy. The sealing is accomplished as previously discussed with the exception that the support rod is also included.

The membrane element is then positioned inside tube 100 as shown in the partial section of FIG. 3 and is held in place in T-joint 102 by pressure fitting 112 through which fiber ends 110 project.

In operation saline water under a pressure greater than osmotic is pumped into the tube through fitting 103. In tube 100 the saline water is purified by reverse osmosis—the membrane material selectively allowing water to pass through and enter the hollow fibers while excluding salt. Product water is then recovered as it drains from the ends 110 of the hollow fibers. Brine, more concentrated in salt than the feed saline water, leaves the tube by fitting 104. The final pressure fitting 105 opens to pressure gauge 106 by which the process can be monitored.

The apparatus used in FIG. 3 is merely illustrative of one system utilizing reverse osmosis membranes and the seals formed by our invention. It is apparent that the actual design of the membrane system could take many forms.

We expect that our invention can be used advantageously to form seals in systems with similar problems. For example, where a water equilibrated membrane is in a configuration where wicking is not a problem (ex. a single large diameter tube), it may still be desirable to surround the active membrane area with a water immobilizing gel during casting to protect these surfaces from the effects of drying. Similarly, wicking may be a problem in some situations in which the fiber does not contain sufficient water to adversely affect the casting resin-fiber interface. This would be the case where essentially dry fiber bundles of reverse osmosis membranes of polyamides, polyesters, cellulose esters polyethylene and others are utilized. Again the gel forming technique may prove beneficial merely to avoid the wicking problem.

In effect either or both of these problems may be avoided by surrounding the active portion of the membrane with a solidifiable material and then casting the seal on the solidified material. While we have used a solution of gelatin as this solidifiable material, we also expect that other materials such as polyglycols, agar solutions, or solutions of sodium silicates, commonly referred to as "water glass" could be used.

Finally, the reverse osmosis membranes which may be sealed by our process should not be limited to those which may be used for desalination, but include others suitable for use in the separation of water from electrolyte solutions including sea water, brackish water, acid mine water, and industrial brines and bitterns; the separation of organic liquids; the purification and concentration of liquid foods such as citrus juices, beer, and syrups; and the purification of liquid wastes such as urine.

EXAMPLE A

A seal was formed as follows on a looped hollow fiber bundle containing 5,000 filaments of reverse osmosis fibers with an outside diameter of 300 microns.

The bundle was pulled into a one inch pipe and sealed at one end with a conventional threaded fitting. About 10 inches of fiber remained exposed at the other end. A warm aqueous gelatin solution (2.8 wt. percent) was pumped into the pipe and then chilled to solidify the gelatin. The exposed fiber ends were washed with hot water to remove traces of gelatin which wicked before solidifying, and the fiber ends were then dried in warm air while continuing to chill the gelatin. Finally, an epoxy sealant was cast onto the hardened gelatin layer with the seal mold surrounding the pipe. After the seal cured, the threaded fitting was detached and the gelatin easily removed by heating and flushing with water.

The hollow fiber bundle and seal were tested in reverse osmosis desalination. At all pressure up to 1,200 psi there were no leaks and reverse osmosis properties were not impaired by seal formation.

We claim:

1. In a process for the manufacture of a high pressure seal molded around a water equilibrated hollow fiber membrane the improvement comprising the steps of:
   surrounding the active area of said fiber with a water immobilizing gel which upon removal will render the fiber ready for use, said gel being selected from the group consisting of gelatin, polyglycols, agar solutions and solutions of sodium silicates,
   drying the exposed end of said fiber, and
   casting a solidifiable sealant resin upon said water immobilizing gel so as to completely surround and encapture the dry inactive portion of said fiber membrane.

2. The process of claim 1 wherein said water equlibrated hollow fiber is a reverse osmosis membrane.

3. The process of claim 1 wherein said water immobilizing gel is solidified gelatin solution.

4. The process of claim 1 wherein said solidifiable sealant is epoxy resin.

5. The process of claim 1 wherein said water equlibrated hollow fiber membrane is a plurality of water equlibrated hollow fiber membranes.

6. The process of claim 5 wherein said plurality of water equlibrated hollow fiber membranes are reverse osmosis membranes.

7. The process of claim 6 wherein said plurality of water equlibrated hollow fiber membranes are reverse osmosis membranes suitable for use in water desalination.

8. A process for the formation of a high pressure seal around the end of a water equilibrated hollow fiber membrane comprising:
   surrounding the active area of said fiber with an aqueous solution of gelatin,
   chilling said solution to solidify said gelatin,
   washing the exposed end of said fiber to remove any gelatin or aqueous solution,
   drying said exposed end of said hollow fiber,
   casting a solidifiable sealant resin around said end of said fiber and adjacent said solidified gelatin solution,
   curing said solidifiable sealant and
   removing said solidified gelatin solution from around said active fiber area.

9. The process of claim 8 wherein said water equlibrated hollow fiber is a reverse osmosis membrane.

10. The process of claim 8 wherein said resin is epoxy resin.

11. The process of claim 8 wherein said water equlibrated hollow fiber membrane is a plurality of water equlibrated hollow fiber membranes.

12. The process of claim 11 wherein said plurality of water equlibrated hollow fibers are reverse osmosis membranes, suitable for use in water desalination.

* * * * *